March 15, 1960   W. J. MORRILL   2,928,961
PUMP MOTOR MOUNTING
Filed Jan. 18, 1956

INVENTOR.
WAYNE J. MORRILL
BY Woodling and Krost
ATTORNEYS

United States Patent Office 2,928,961
Patented Mar. 15, 1960

2,928,961

PUMP MOTOR MOUNTING

Wayne J. Morrill, Garrett, Ind.

Application January 18, 1956, Serial No. 559,830

5 Claims. (Cl. 310—91)

My invention relates in general to motor mountings, and in particular to an improved motor mounting to be attached to one end of an electric motor for supporting the motor from the frame of the load being driven.

My invention relates especially to a new pump and motor mounting with elastic supporting of the motor on the pump. Although my invention may be used on all types of fluid pumps, I have illustrated and described my preferred structure in connection with a water pump. In the past, circulation pumps, such as are used in increasing the flow of water in water systems, have been made with an elastic or resilient coupling between the motor rotor and the pump rotor. The motor has also been elastically supported separately from the pump. I have found that with my mounting I can support the motor housing directly from the pump housing with a resilient material which serves as the supporting means and also as a means for sealing in the fluid which is being pumped. In the preferred embodiment of my invention, the rotor shaft of the motor extends into the pump housing and carries the circulating blades thereon. The prior circulation pumps, wherein an elastic coupling was used between the motor rotor and the pump rotor, would not have the motor shaft extending into the housing of the pump. One of the major problems involved was that of sealing the pump housing and the motor shaft so that fluids or liquids being circulated by the pump would not leak out of the pump, and another problem involved obtaining satisfactory vibration isolating characteristics.

The present application is a continuation-in-part of my original application on Pump Motor Mounting bearing Serial No. 125,113 and filed in the Patent Office on November 2, 1949, now abandoned; and a continuation-in-part of my application on Motor Mounting, Serial No. 448,523, filed on August 9, 1954.

Many times it is desired to mount an electric motor, such as for example, a small electric pump motor, in such manner that the motor has a slight amount of rotational freedom, but does not have any translational movement. It has generally been considered that a motor would droop if it were mounted on one end only and with resilient mountings which would permit this slight rotational movement. A realization of the difficulty of producing sufficient mechanical rigidity to droop and to vibrations due to mechanical unbalance has probably kept others from using a single end elastic support. After many attempts I found that the proper characteristics could be obtained whereby an electric motor can be effectively supported on one end only. An important part of my invention has to do with the discovery that a motor may be supported in a horizontal position from one end by means of flat elastic washers or thin elastic members and given sufficient rotary freedom about the shaft axis for good rotary vibration isolation without having excessive droop or excessive freedom to vibrate about an axis perpendicular to the shaft. Resilient mountings for motors are very desirable also to prevent the traveling of vibration and noise caused by the motor into the structure which supports the motor. Therefore, one of the objects of my invention is to provide a motor mounting which will permit slight rotational movement of the motor and yet will prevent translational movement.

Another object of my invention is to provide an elastic support for the motor which drives the pump and at the same time have this elastic support serve as a seal to prevent liquid escaping from the pump housing.

Another object of my invention is to mount a motor housing resiliently on a pump housing with the drive shaft of the motor extending into the pump housing.

A further object of my invention is to mount a pump motor housing on the pump housing with a resilient or elastic supporting material which also serves as a seal for the opening in the pump housing to prevent liquid escaping from the pump housing into the motor or between the motor housing and the pump housing.

A further object of my invention is to mount a motor housing on a pump housing with a resilient support means engaging surfaces of the housing to prevent leakage of fluid from the pump housing.

Another object of my invention is to provide a motor mounting which supports the motor at one end thereof without letting the motor droop.

Another object of the invention is to provide a single end elastic mounting for a single phase motor so proportioned as to effectively minimize transmission of double frequency vibration to the supporting structure.

Another object of the invention is to provide a single end elastic mounting as to minimize the droop of the motor due to its overhung weight and that of any attached apparatus.

Another object of the invention is to provide an elastic mounting that will be simple in construction, low in cost, and easily applied.

Another object of the invention is to provide an elastic mounting that will use a minimum of rubber or rubber-like material and thus be compact as well as low in cost.

Another object of the invention is to provide an elastic mounting that will add little to the overall length of the motor.

Another object of the invention is to provide an elastic mounting that is especially adapted to pump motors with the pump and motor rotors fixed on the same shaft and with minimum droop of the motor in cantilever mounting to prevent destroying the alignment of the pump rotor in its housing.

Another object of the invention is to provide a single and elastic mounting that provides adequate support against shipment shocks when the motor and assembled apparatus are transported.

Another object of the invention is to provide a single end elastic mounting that provides adequate stiffness against vibration of unbalanced apparatus.

Another object of the invention is to provide a single end elastic mounting which may be easily disassembled to allow replacement of either the motor or the rubber.

Another object of the invention is to provide a single end elastic mounting which is coaxial with an axis through the center of gravity of the stator of the motor.

A still further object of my invention is to provide a resilient motor mounting which is economical to manufacture, and which has a sturdy construction.

Still another object of my invention is to provide a motor mounting in which the motor is supported on one end only with the armature shaft in a horizontal plane, with good vibration isolation whereby the natural frequency of the mass in vibration on the elastic support is considerably less than the frequency to be isolated.

Other objects and a fuller understanding of my invention may be had by referring to the following description and claims, taken in conjunction with the accompanying drawing, in which:

Figures 1, 2, 3:
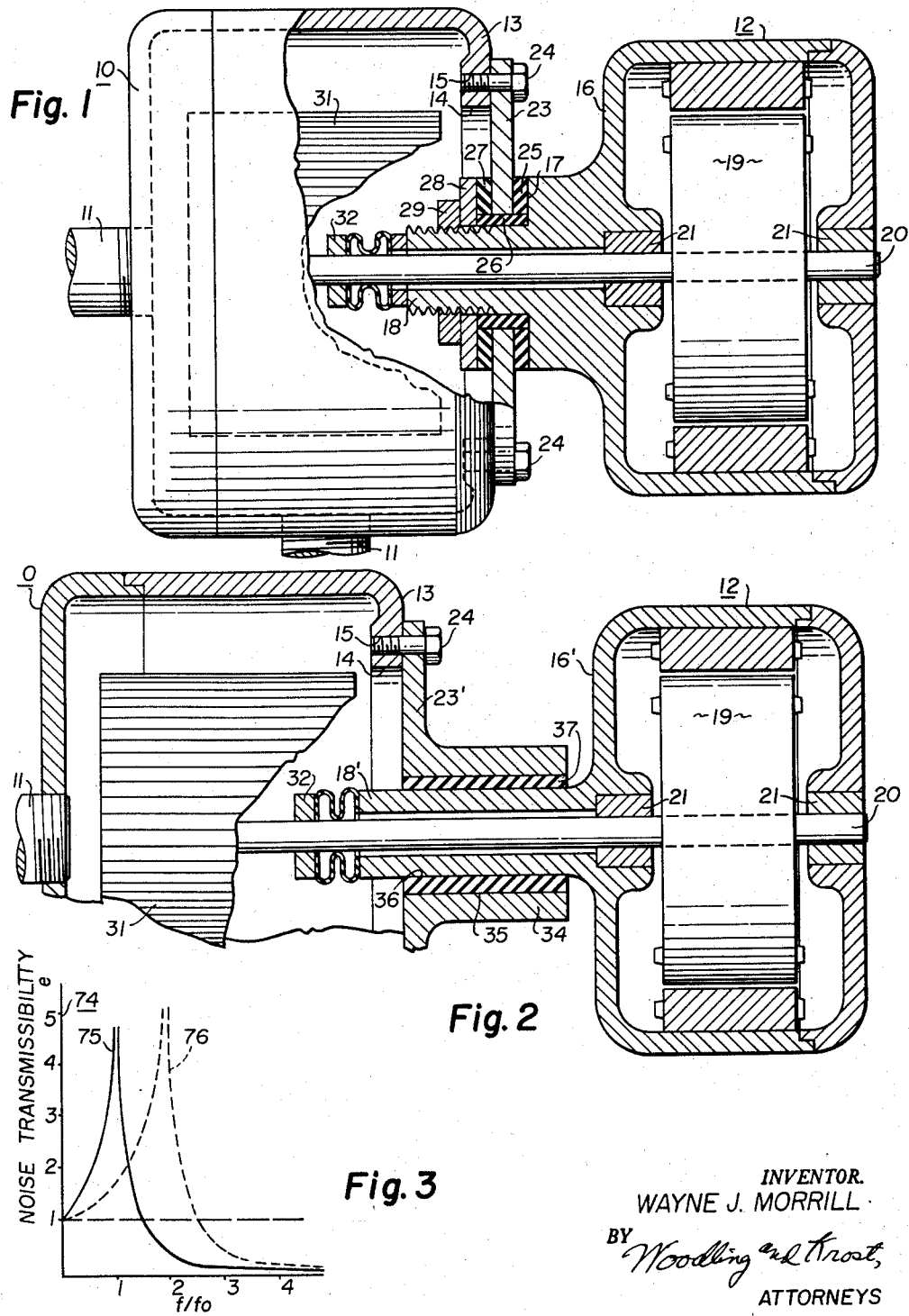
Figure 1 is a cross-sectional view of a fluid pump having the driving motor mounted on the housing thereof.
Figure 2 is a cross-sectional view of a modification of my invention.
Figure 3 is a graph of noise transmissibility versus mounting flexibility.

In Figure 1 of my drawing, I illustrate a fluid pump 10 supported by pipes 11 and driven by an electric motor 12. The pump 10, although illustrated as being supported by the pipes 11, which serve as inlet and outlet pipes, may be supported in any suitable manner known to industry. The pump 10 has a pump housing 13 with a large opening 14 therein and a plurality of threaded bolt holes 15 spaced in the pump housing 13 and about the large opening 14.

The motor 12 has a housing 16 providing an end surface 17 and a hub 18 extending outwardly from this end surface 17. A rotor 19 mounted on a drive shaft 20, which is journalled in the housing 16 by bearings 21, provides motive power for rotating the drive shaft 20.

The motor housing 16 is mounted on the pump housing 13 by an end wall, mounting plate or support member 23. This mounting plate or support member 23 has a small opening in the center thereof, through which the hub 18 extends, and has bolt holes aligned with the bolt holes 15 in the pump housing 13. Bolts 24, extending into these bolt holes, removably mount the mounting plate 23 on the housing 13 so that it covers the large opening 14.

In mounting my motor housing on the mounting plate 23, a resilient or elastic washer 25 and a resilient sleeve 26 are first slipped on the hub 18 with the washer 25 positioned against the end surface 17 of the motor housing. The mounting plate 23 is next inserted over this sleeve 26 and against the washer 25. A second washer 27, also of resilient or elastic material, such for example as rubber, is positioned against the other side of the mounting plate 23. With this construction, the mounting plate 23 is isolated from the motor housing and the surfaces of the mounting plate are spaced from and face the surfaces of the motor housing. The resilient washers and the sleeve seal the space between the motor mounting plate 23 and the hub 18, and between the mounting plate and the end surface 17 to provide a resilient supporting of the motor and also seal the pump housing. A non-resilient washer 28, generally constructed of metal, is backed by a nut 29 threaded on the hub 18 to hold the resilient washers and thus the mounting plate 23 in correct supporting position.

The drive shaft 20 of the motor 12 extends through this hub 18 and thus through the opening in the mounting plate 23 into the pump housing 13. A circulating propeller or circulating blades 31 may be fastened by suitable means to the end of this drive shaft 20 for rotation within the pump housing to circulate fluid. The propeller 31 may be mounted on the end of the drive shaft 20 after the mounting plate 23 has been fastened to the motor housing 16 and before the mounting plate 23 has been fastened to the pump housing 13. A shaft seal 32 mounted on the drive shaft 20 between the propeller 31 and the end of the hub 18 prevents leakage of fluid around the shaft and into the motor 12.

The mounting plate or end wall 23′ in Figure 2 of my drawing is provided with a cylindrical portion 34 extending concentrically with the hub 18′ of the motor. The cylindrical portion 34 and the hub 18′ have surfaces 35 and 36, respectively, spaced apart and facing each other. In this mounting I have used a sleeve 37 of elastic or resilient material between the surfaces 35 and 36, and which preferably is bonded or cemented to these surfaces 35 and 36. This sleeve 37 seals the space between the hub 18′ and the cylindrical portion 34 of the mounting plate or end wall 23′, as well as resiliently supporting the motor housing. The mounting plate and the motor housing may be referred to as having concentric portions with one of the concentric portions extending into the other of the concentric portions. These concentric portions are spaced apart and are resiliently held relative to each other by the resilient or elastic material.

The mountings of both Figures 1 and 2 are small in diameter relative to the outside diameter of the motor housing 12 and preferably are less than forty percent of the diameter of the motor 12. Each of the elastic mountings of Figures 1 and 2 provides elastic members so positioned that they are thin in a direction resisting the compressive force caused by the cantilever mounting and are relatively large in area. Also, such elastic members of both figures are relatively thin in a direction perpendicular to the direction of application of the shear force yet small in diameter relative to the diameter of the motor so as to be relatively flexible in shear.

In Figure 1 the lower portion of elastic washer 25 would be in compression because of the cantilever mounting, and similarly the upper portion of elastic washer 27 would be in compression. Preferably the nut 29 is tightened so that both washers 25 and 27 are prestressed to a point such that because of the cantilever mounting the pre-compression in the upper portion of elastic washer 25 and the lower portion of washer 27 is not completely relieved by the slight droop of the motor 12 because of its cantilever mounting. The washers 25 and 27 may be approximately one-eighth inch thick and may be circular in area so that the one-eighth inch thickness is the dimension resisting compression due to the cantilever mounting and the large circular area is the area on which this compressional force is borne. Also, the shear force is rotational about the axis and the washers 25 and 27 are thin in a direction perpendicular to the direction of application of this shear force.

In Figure 2 the elastic sleeve 37 is loaded in compression at the lower right end and the upper left end, as viewed in Figure 2, because of the cantilever mounting. Because of the bonding or cementing of the sleeve 37 to the adjacent surfaces, the upper right and the lower left portions of the sleeve 37 will be under slight tension. Again this sleeve may be approximately one-eighth inch radial thickness and therefore the sleeve 37 is in thin in the direction of the compressional force caused by the cantilever mounting and has a relatively large area resisting this force, which area is a generally cylindrical surface area. Also, the elastic sleeve 37 is thin in a direction perpendicular to the direction of application of the shear force which again is a rotational force about the axis.

Stated in another way, each of the elastic mountings of Figures 1 and 2 has a dimension in the direction of the compressional force which is small relative to the largest dimension of that portion of the mounting perpendicular to the compressional force direction. Also, that portion of the elastic member which resists the shear force has a dimension in a direction perpendicular to the direction of application of the shear force which is small relative to the dimension of the shear resisting portion in the direction of the shear force.

It is well known that in order to obtain good vibration isolation the natural frequency of a mass in vibration on its elastic support must be considerably less than the impressed frequency which it is desired to isolate. The equation for noise transmissibility is:

$$e = \frac{1}{(f/f_0)^2 - 1}$$

$f_0$ = natural frequency
$f$ = impressed frequency

If the natural frequency cannot be made less than .707 × impressed frequency, the elastic support will actually increase the transmitted vibration from the motor to the pump 10 and its support 11 and do harm instead of good. Since it is usually impractical to make an elastic support sufficiently flexible to have it effective in isolating the low frequency vibrations due to mechanical unbalance, the problem normally resolves itself into that of providing sufficient flexibility to satisfactorily isolate the high frequency (120 cycles and higher for 60 cycles current) magnetic vibrations while providing sufficient stiffness not to appreciably magnify the low frequency mechanical vibrations. By way of example, suppose an 800 r.p.m., 60 cycle motor is to be elastically mounted. The electrical vibration (rotary about shaft axis) has a frequency of 120 cycles and the mechanical vibration has a frequency of 13.3 cycles perpendicular to the shaft. The problem is to produce a mounting which, acting with the motor mass, will have a natural rotational frequency of preferably less than 20 cycles while having a translational and a perpendicular to shaft rotational natural frequency of more than 26.6 cycles.

In Figures 1 and 2 of my drawing, I illustrate a motor 12 elastically mounted on the pump housing 10 to provide good vibration isolation without permitting the motor to droop, and hence preventing misalignment of the pump rotor 31 relative to its housing 10. The resilient washers 25 and 27 permit slight rotational freedom of the motor 25 relative to the support plate 11. However, they prevent translational movement or drooping of the motor. This motor mounting may be used on many small motors such as those used for small pumps, and the motor may be suspended horizontally or vertically.

When the motor mounting is constructed in the manner shown in Figure 1, a plurality of non-resilient laminations and a plurality of resilient laminations are formed. The non-resilient laminations include the end surface 17, mounting plate 23, and washer 28. The resilient laminations include the resilient washers 25 and 27. The resilient washers or laminations will prevent translational movement and droop of the motor even though the resilient sleeve 26 is omitted. In many instances, I have found it preferable to cement the resilient washers to the adjacent surfaces. Any suitable bonding cement or method of bonding resilient materials to other material may be used.

This mounting of Figures 1 and 2 has been found to be quite satisfactory to perform the two functions of providing sufficient rotary elasticity to isolate from the support the impressed frequency, which is often termed the single phase torque vibration, and yet to have sufficient stiffness along the axis to prevent any appreciable droop caused by the cantilever load or any other movement perpendicular to the axis of the motor 12. It will be noted that stiffness along the axis which provides resistance to the droop moment is required in the constructions of Figures 1 and 2 because otherwise the pump rotor 31 would become misaligned with the axis of the pump housing 10. Thus, the elastic mounting to be satisfactory must be sufficiently stiff along the axis to prevent such misalignment no matter how the housing 52 is positioned in use, and also to withstand shocks in shipment, and further to resist any appreciable increase in droop due to aging of the rubber.

The graph 74 of Figure 3 is a graph of noise transmissibility $e$ plotted against increasing flexibility of the elastic mounting. The graph 74 shows a solid line curve 75 and a dotted line curve 76. Both curves start at unity on the ordinate and curve 75 goes to infinity at unity on the abscissa. The abscissa, which is increasing flexibility, is a numeric expressed as the ratio of the impressed frequency $f$ divided by the natural frequency of vibrations $f_0$ of the mass $m$ of the stator of the motor on an elastic mounting having a spring constant K. The curve 75 is a curve of noise transmissibility $$e = \frac{1}{\left(\frac{f}{f_0}\right)^2 - 1}$$

It shows a noise transmissibility for the case of the vibrating motor being attached to a rigid foundation through the elastic mounting. This might be similar to the case of an electric motor elastically mounted in rotary shear to a concrete floor which has a relatively large mass. In such case, the curve 75 shows the ratio of the vibration amplitude produced in the foundation of large mass when using the elastic suspension to that produced with a rigid connection between the motor and the foundation.

The curve 76 shows more nearly the actual conditions since this is plotted with a case where the inertia of the support is ten percent of the motor inertia.

The above-described elastic mountings provide rubber or other resilient washers which are relatively small in outside diameter compared with the outside diameter of the electric motor. This is far more important than one would ordinarily believe. A common form of elastic mounting for a fractional horsepower motor is to use a U-shaped mounting frame which straddles the motor, and the ends of the U-shaped bracket carry rubber rings in which the two opposite motor hubs of the motor end bells are mounted. The predomimnant magnetically produced vibration of a single phase electric motor is a rotary vibration at twice line frequency about the axis of the motor. Thus, this rotary vibration produces predominantly shear stress in the rubber mounting. The sideways (to the shaft) force due to motor unbalance or due to motor weight or belt pull in taken by compressive forces in the rubber rings, it being well known that rubber is more flexible in shear than in compression.

In the present case of a single elastic mounting, as opposed to a conventional elastic mounting attached to each of the two ends of the motor, the elastic mounting is subjected not only to shear caused by rotary vibration and to compression in sleeves 26 and 37 caused by the motor weight, but when the motor axis is horizontal, it is also subject to a moment due to the overhung motor weight. This moment tends to increase the rubber compression in the bottom of rubber washer 25 and to reduce the compression in the rubber in the top half of the same washer. By this use of rubber, the desired rotary freedom of the motor is permitted by the rubber in shear whereas the undesired vibration or movement due to unbalanced weight or belt pull is restrained by rubber in compression. Under the influence of this moment, the rubber washer 25 tends to become thinner at the bottom and thicker on top with the result that the motor tends to droop in its mounting. The problem is to make the washers sufficiently flexible in shear to do a good job of isolating the double frequency torque vibration while at the same time being sufficiently stiff to the moment to prevent an undesirable amount of droop. If the electric motor is not properly resiliently mounted, this vibration is transmitted to the motor support and thus to the good sound transmitting support pipes 11, thus producing large amounts of annoying noise. This is referred to in my article in Electrical Manufacturing, May 1938, page 76. It is also referred to in "Vibration Prevention in Engineering" by Arthur A. Kimball, 1932, at page 96. These two references show graphs of noise transmissibility versus flexibility of the elastic mounting. This graph is the basis for Figure 3 of the present drawing. Kimball states that for good sound isolation, one should have a spring suspension which is sufficiently flexible that the ratio of impressed frequency to the resonant frequency of the motor stator is about six or seven to one. This reduces the noise transmitted to one in thirty-five or one in forty-eight.

The problem thus becomes to obtain this elastic mounting which is sufficiently flexible to shear yet sufficiently rigid to prevent droop in the present case of a single elastic mounting for a cantilever support of a motor.

The rotary vibration of fractional horsepower motors, which generally are single phase motors, is frequently called the single phase torque vibration. For sixty-cycle alternating current power, this will be one hundred twenty cycles per second, since the flux has one hundred twenty reversals per second.

If the rubber washers in the elastic mounting are made large relative to the diameter of the motor, which is a natural design tendency to limit the droop of the motor, it will then be shown that the rotary elasticity of the mounting is far from adequate. My article in Electrical Manufacturing, supra, shows on page 80 an electric motor designed for vertical axis mounting and it was designed for a garbage disposal unit for home use. In that motor mounting there were two rubber washers sandwiched between metal mounting plates so that the rubber washers were subjected to rotary shear. However, they did not withstand any bending moment, since there was no sideways belt pull nor was there any cantilever loading since the loading was designed for a vertical axis condition. Also in that case, the mounting was designed for good axial stiffness, and to obtain close tolerance of shaft concentricity relative to the mounting holes, at the expense of best possible noise isolation. For confirmation, that article mentioned that the noise isolation was not as good as in the case of the double ended shear mounting. Still further, I have now discovered that the diameter of the rubber rings of mounting was much too large, as will hereinafter be evident.

The first consideration is the determination of the natural frequency of vibration $f_0$, in order to determine the point of operation on the graph of Figure 3 for the mounting of Figure 1. The calculations for the mount of Figure 2 would be similar, but those for the Figure 1 type of mounting will be used as an example. The natural frequency of a rotary oscillating system is determined by:

$$\omega_0 = \sqrt{\frac{K}{I}} \quad (1)$$

where $$\omega_0 = 2\pi f_0 \quad (2)$$

K is the spring constant in pound feet per radian, and I is the moment of inertia of the motor stator in poundal feet squared.

The moment of inertia of the stator portion of the motor is that which is of interest. It is the stator which has a rotary vibration, namely, the single phase torque vibration. Its vibration is passed by the elastic mounting to the support for the entire motor in accordance with the stiffness of that mounting. Since the motor stator is not a regular geometrical figure, the calculation of the moment of inertia is extremely difficult. Therefore, a right cylindrical mass was used as a standard to calibrate a torsion pendulum by determining the period of vibration of this standard. A motor stator of about six inches outside diameter was then placed in the same torsion pendulum, its period determined, and from this and the calculated moment of inertia of the standard cylindrical mass, there was determined the moment of inertia of the motor stator. It was determined to be:

$$I = .01155 \text{ poundal feet}^2 \quad (3)$$

The present state of the art of the rubber usable in elastic mountings is such that the rubber of a hardness of durometer 50 has been used in order to obtain satisfactory life of the rubber. Still softer rubber, namely, durometer 30 hardness, may be used; however, this is not considered to have satisfactory life and the rubber companies prefer to recommend a minimum hardness of 40 durometer in order to get adequate life in something like an electrical appliance which should last for several years. The data obtainable from one of the large rubber companies on a particular type of natural rubber of durometer 50 hardness is that it has an initial shear modulus of elasticity.

$$G = 50 \text{ pounds per square inch} \quad (4)$$

Similar information on a very good grade of neoprene of 50 durometer is that it will have an initial shear modulus G of 85 pounds per square inch. These values are static values and must be increased somewhat to obtain the value required for dynamic loading of the rubber at 120 cycles per second, and must be increased further to allow for aging, which is expected to take place during a year or so of actual operation. For calculation purpose, it is estimated that these figures of G should be increased to 70 and 125 pounds per square inch for the best compounded natural rubber and neoprene, respectively.

The rotary elasticity of the entire mount depends upon the shear modulus of elasticity of the rubber as well as the physical shape of the elastic mounting. The spring constant K is generally inversely proportional to the elasticity, and thus.

$$K = \frac{T}{\theta}$$

where T is torque causing rotary momement, and $\theta$ is the angle of movement in radians. This is true, because the stiffer the spring, the smaller will be the angle of movement for a given torque. The mounting of Figure 1 has two rubber washers. By way of example, the elastic mount of Figure 1 may have an outside diameter of $D = 1.73''$, an inside diameter of $d = .875''$, and a thickness of $t = .12''$.

The formula for the resisting torque T of a rubber washer in rotational shear is $$T = \frac{\pi G \theta (D^4 - d^4)}{2 t \cdot 16} \quad (5)$$

where $\theta$ is the angle in radians.

$$T = 1.57 \frac{G \theta (D^4 - d^4)}{t \cdot 16} \quad (6)$$

Substituting, with $G = 70$ for natural rubber, one obtains $$T = 1.57 \times \frac{70}{.12} \left(\frac{8.335}{16}\right) \theta \quad (7)$$

Therefore, since the spring constant K for one washer is $$K = \frac{T}{\theta} \quad (8)$$

expressed in pound feet per radian, $$K = 476 \frac{1}{12} = 39.7 \text{ pound feet per radian} \quad (9)$$

Now since the elastic mount of Figure 1 contains two washers, a total spring constant of the elastic mount is $$K = 79.4 \text{ pound feet per radian} \quad (10)$$

If one were to use synthetic rubber, this would increase the spring constant K by the ratio of 125/70, or a value of 142.2 pound feet per radian.

The natural frequency of vibration $f_0$ is then determined from Equation 1, and is $$f_0 = \frac{1}{2\pi} \sqrt{\frac{K}{I}} \quad (11)$$

$$f_0 = \frac{1}{2\pi} \sqrt{\frac{79.4}{.01155}} = \frac{1}{2\pi} \sqrt{6870}$$

$$f_0 = \frac{1}{2\pi} \times 82.8 = 13.18 \quad (12)$$

for natural rubber of shear modulus of 70. For synthetic rubber, with shear modulus of 125, the value of the natural frequency of vibration would be 125/70 times 13.18, or 17.6 cycles per second. Therefore, the ratio $$f/f_0 \text{ is 9.1 for natural rubber} \quad (13)$$

or $$f/f_0 = 6.82 \text{ for synthetic rubber} \quad (14)$$

This is a satisfactory point of operation on either curve of Figure 3. Thus, the noise transmissibility is a satisfactorily low 1.22 percent for natural rubber or 2.19 percent for synthetic rubber.

The graph of Figure 3 shows the noise transmissibility $e$ versus flexibility. The abscissa is expressed as a ratio of impressed frequency to the free vibration frequency of the mass of the stator on the elastic mount. The noise transmissibility $e$ is defined as the ratio of the vibration amplitude produced in the support when using the elastic suspension to that produced with a rigid connection. The easiest case to analyze mathematically is when the foundation or housing has a relatively infinite mass. This is shown by the curve 75 in the graph 74 of Figure 3. This might typify the case where an electric motor is elasticly mounted on a concrete floor.

The graph 74 shows a curve 76 in dotted lines which is a noise transmissibility curve when the moment of inertia of the housing is only 10 percent of the motor stator moment of inertia. This curve 76 shows that as the foundation or support becomes lighter relative to the mass of the motor, the problem of noise transmissibility increases. In the present case of a housing weighing in the same order of that of the motor stator, the noise transmissibility curve will lie somewhere between the curves 75 and 76.

It will be noted, that if the impressed frequency $f$ equals the free vibration frequency $f_0$, then this is a resonant condition with tremendously increased noise transmissibility. This is indicated by curve 75 since where $f=f_0$ the noise transmissibility $e$ goes to infinity. From the formula of spring constant $K$, it will be seen that if the rubber mounting is too large in diameter, it will be quite stiff, since the stiffness increases as $D^4$, and thus the free vibration frequency $f_0$ may be relatively high. If the free vibration frequency $f_0$ exceeds .707 of the impressed frequency $f$, then the noise transmissibility $e$ will be actually worse than the case where a direct metal-to-metal connection is used from motor to support. As shown on curve 76, the elastic mounting must be even more elastic in the actual case of a housing not having very large mass. Thus, one strives to obtain an elastic mounting which is as flexible as possible in rotary shear, consistent with sufficient rigidity in other directions and the permissible stresses in the rubber.

It is thus seen from Equations 13 and 14 that the elastic mounting using rubber washers of 1.73 inches outside diameter, when used with an electric motor having an outside diameter of about six inches, is sufficiently flexible. With these dimensions, the outside diameter of the rubber washer is about 28 percent of the outside diameter of the motor.

The spring constant $K$ obviously increases as the diameter of the washer increases. The moment of inertia of a cylinder about its axis is $m\bar{r}^2$, where $m$ is the mass and $\bar{r}$ is the radius of gyration. For constant natural frequency and for constant washer thickness, the spring constant of the washer is proportional to this moment of inertia of the washer and $$K=Q\frac{(D^4-d^4)}{t} \qquad (15)$$

wherein $Q$ is a constant. In the actual case of my rubber washer mounting the inside diameter $d$ is approximately half the outside diameter $D$. This is not essential; it merely happened to be the proportions in this particular mounting. In the general sense, let $d=aD$ where $a$ is a constant. This means that the inside and outside diameter bear a constant ratio. The spring constant of the washer thus becomes $$K=Q\frac{D^4(1-a^4)}{t} \qquad (16)$$

Let us now investigate what would happen should one desire to make the outside diameter $D$ "$b$" times as large yet to maintain the same spring constant. From the above formula, it will be obvious that to maintain the same $K$ with the diameter now changed to $Db$, one must make $tb^4$ times as thick. The formula thus becomes $$K=\frac{QD^4b^4(1-a^4)}{b^4t} \qquad (17)$$

Now if one takes an example "A," wherein $b=2$, namely, the outside diameter has become twice as big, we find that it has changed from 1.73 inches to 3.46 inches. Also, the thickness which originally was ⅛ of an inch has now become $b^4$ times as thick, or 16 times as thick, or two inches. Also, if the diameter is doubled, the area is four times, and therefore the volume is 64 times as great. This grotesque mounting of example "A" is shown as Figure 13 of my parent case, Serial No. 448,523, and would have the same flexibility in rotary shear as the compact mounting of Figures 1 and 2. It is obvious that the diameter of the rubber washers cannot approach 60 percent of the outside diameter of the electric motor without becoming unduly thick.

The value of $$\frac{K}{I}$$

is important, since the square root of this quantity equals $\omega_0$. From Equations 5, 8 and 11, it will be noted that if the diameter $D$ is doubled, $K$ increases by 16 times, yet $I$ remains the same, hence $\omega_0$ increases by 4 times, or $b^2$. With $$\frac{K}{I}$$

equaling 6870, and this giving a ratio of $f/f_0$ of either 9.1 or 6.82 for natural or synthetic rubber, it will be seen that $$\frac{K}{I}$$

may increase to about 30,000 before one reduces the ratio $f/f_0$ to a low limit value of 4.3 for natural rubber.

If one now keeps the thickness of the washers at .12 inch, and increases the diameter from the value of 28.8 percent of the motor outside diameter to the value of 40 percent of the motor outside diameter, then the ratio of $f/f_0$ decreases by the ratio of $(28.8/40)^2$. Thus, $f/f_0$ for natural rubber changes from 9.1 to a low limit value of about 4.7.

In the mounting of Figure 1 the washers being only ⅛ of an inch thick provide a satisfactorily small angle of droop. A determination of the droop is important. For only a single rubber washer the calculation of the droop is as follows:

$$dF=\frac{2xdy\ y\theta}{t}E \qquad (18)$$

Where $F$ is the force, $x$ and $y$ are the abscissa and ordinate of the point defining the locus of a circle in the mathematical formula of a circle which is $r^2=x^2+y^2$, with $r$ being the radius. $E$ is the compression modulus of elasticity, or Young's modulus. This formula holds because the washer 25 is under compression in the lower half of its semi-circular periphery. As $y$ increases, namely, the distance along the ordinate from the neutral axis, the compression of the washer increases. Since the torque $T$ equals force times distance, then $$dT=\frac{2xdy\ y\theta}{t}Ey \qquad (19)$$

Since $$x=\sqrt{r^2-y^2} \qquad (20)$$

then $$dT=2\sqrt{r^2-y^2}y^2dy\theta\frac{E}{t} \qquad (21)$$

One can assume the same torque from the upper half of the rubber washer. This is because the elastic mounting of Figure 1, for example, will preferably be prestressed in compression so that the bending moment or torque caused by the overhanging load will partly relieve this compression of the upper half of the washer but will not entirely relieve it. Thus, the upper half of the washer contributes to resistance to droop of the motor. Integrating, we obtain $$T = 4\int_0^r \theta \frac{E}{t}\sqrt{r^2 - y^2}\, y^2 \, dy \quad (22)$$

$$T = 4\theta\frac{E}{t}\left[-\frac{y}{4}\sqrt{(r^2-y^2)^3} + \frac{r^2}{8}\left(y\sqrt{r^2-y^2} + r^2 \sin^{-1}\frac{y}{r}\right)\right]_0^r$$

$$T = 4\theta\frac{E}{t}\left[\frac{r^4}{8}\sin^{-1}\frac{r}{r}\right]$$

$$T = \frac{\pi}{8}\theta\frac{E}{t}r^4, \text{ for one washer} \quad (23)$$

Thus, the torque equals $$T = \frac{\pi}{4}\theta\frac{E}{t}r^4 \text{ for two washers} \quad (24)$$

From a handbook on rubber, one obtains $E = 375$ pounds per square inch per inch for rubber of 50 durometer hardness. Thus, the torque becomes $$T = \frac{\pi}{4} \times \frac{375}{.125}(1.75^4 - .875^4) \times \frac{1}{16}\theta \quad (25)$$

$$T = 151(8.92 - .585) \times \frac{1}{16}\theta$$

$$T = 151(8.335)\theta$$

$$T = 1284 \text{ inch pounds per radian} \quad (26)$$

Assuming a typical motor weight of about 14 pounds and a moment arm of about 2 inches, namely, the horizontal distance from the center of the mounting to the center of mass of the motor, the torque or moment is equal to 28 inch pounds. Therefore, $$\theta = \frac{28}{1284} \times \frac{180°}{\pi} = 1.25° \quad (27)$$

This is a satisfactorily small angle of droop in the mounting of Figure 1. This means that the angle of the motor is dropped down 1.25° relative to the horizontal or relative to the axis of the mounting.

It now becomes necessary to determine whether the compressive stress in the rubber caused by the moment of droop exceeds the maximum compressive stress consistent with satisfactory life of the rubber. The moment of inertia of a circle about its diameter is $$I = \frac{\pi r^4}{t} \quad (28)$$

From handbooks, we determine that $$S = \frac{Mc}{I} \quad (29)$$

where $S$ is the stress in pounds per square inch, $M$ is the moment causing droop, and $c$ is the distance from the neutral axis to the extreme fibers of the rubber washer which in this case is equal to the radius. The moment of inertia of the washer about its horizontal neutral axis is thus $$I = \frac{\pi r^4}{4} - \frac{\pi}{4}(1.73^4 - .875^4)\frac{1}{16} \quad (30)$$

$$I = \frac{\pi}{4}(8.92 - .585)\frac{1}{16}$$

$$I = 6.54s\frac{1}{16} = .408 \text{ inch}^4 \quad (31)$$

The moment of droop is, $$M = 14 \times 2 = 28 \text{ inch pounds} \quad (32)$$

and, $$\frac{c}{I} = \frac{1.73}{.408 \times 2} = 2.12, \text{ for two washers}$$

Therefore, $$S = 28\,(2.12) = 59.4 \text{ pounds per square inch for one washer} \quad (33)$$

The above calculation assumes that the compressive forces at the bottom of the washer are equal to the tension forces at the top, or vice versa. If the washer is not bonded to adjacent surfaces, no dependable tension forces will be present and it is necessary to prestress the washers in compression by an amount equal to the maximum tension which will exist if a gap is to be avoided. If the rubber is prestressed in compression by this amount, it is obvious that the maximum stress in compression will be doubled. But since two washers are actually used, the above is correct for two prestressed washers acting together.

The stress of about 60 pounds per square inch in the outermost fibers of the rubber is satisfactory, since 250 p.s.i. is a safe limit, and since it is relatively small, the amount of increasing droop with age will be negligible.

The shape of the rubber mounting under compression determines the percentage deflection per inch. Thus, data supplied by the rubber companies is that if a block of rubber 4 inches long, one inch wide, and one inch thick is compressed along its thickness, then the rubber bulges out along the four sides to which no pressure is applied, such that the deflection is 18 percent of the thickness. Now, however, if the length and width are held constant and the thickness is reduced to one tenth of an inch, then the deflection is only 2.7 percent of the thickness.

This comparison of deflections of 18 percent and 2.7 percent of the thickness means that the actual droop is even greater than the percentages. These are for thicknesses of a ratio of 10 to 1. Since the thickness of the rubber in the case of the 18 percent deflection is 10 times as great as the thickness in the case of the 2.7 percent deflection, the actual deflection is 180/2.7, or 66½ times as great. While the nature of the deflection in the case of Figure 1 is different from that of example "A" mentioned following Formula 17, namely, with washers twice the diameter, it can still be seen that the proportions of example "A" will result in much more droop than would be the case for the much thinner washers of Figure 1. While it is preferable to have the rubber and metal surfaces bonded, so as to prevent movement of the rubber with respect to those surfaces, and to permit the rubber to be put in tension because of the droop, it has been found that good mountings of this type can be produced without bonding the rubber to the metal. It has been found that even with uncemented surfaces, the rubber tends to adhere to the metal surfaces of its own accord, thus accomplishing much of the same effect as if the surfaces had been bonded together.

A comparison of the mounting of Figure 1 and example "A" illustrates the practical aspects of the above data. In the mounting of example "A" with the two-inch thick rubber washers 70 and 71, the droop moment causes the washers to be squeezed out between the metal supports because of the large distance between the end of the motor housing and the support plate. In contrast, the rubber washers of Figure 1 have no such chance to squeeze out. Being only one-eighth of an inch thick, the peripheral area of the washer is so small that any squeezing out between the end surface 17 and the mounting support plate 23 is negligible in comparison with that of example "A." Thus, this comparison illustrates why a large rubber washer mounted for vibration in shear is impractical since one must make it sixteen times as thick for a doubled diameter in order to obtain the same rotary elasticity. Apart from the obvious awkwardness of the structure, it is obvious that with the thick rubber washers of example "A" the droop becomes very much greater than in Figure 1.

The droop is still further increased in example "A," because with the two-inch thick washer, the moment arm from the support plate 154 is now increased from about two inches to four inches, and thus the droop moment is approximately doubled.

Conversely, the rubber washer may be made smaller than that shown in Figure 1. Referring to Formula 17, if $d$ is made one-half, in other words, the outside diameter of the washer is cut in half yet keeping the same proportion of outside diameter to the inside diameter of the rubber washer, one then finds that for the same spring constant K the new thickness becomes .0078 inch. Also, the volume of the rubber washer is one sixty-fourth as much as formerly. This thickness of the rubber washer of only about eight-thousandths of an inch is getting so thin that imperfections or roughness in the end surface 17 or mounting plate 23 may cut through the rubber or cause localized points of stress which will exceed the maximum allowable compressive stress on the rubber consistent with satisfactory life. It will be noted from the above that as the diameter is reduced to one-half, the thickness is reduced to one-sixteenth. This extreme thinness of the rubber washer makes the motor still more resistant to droop than formerly and thus is an improvement from that standpoint, yet the limits of maximum stress of compressibility of the rubber will limit the amount one can go in this direction. Using the Formulas 29 and 30 above, the maximum compressive stress of such a washer of $D=.875$ becomes eight times as great, because the moment of inertia of the washer about its axis is now only one-sixteenth and $c$ is now one-half their former values. The stress in the outermost fibers of the washers thus exceeds the maximum allowable, unless a better quality of rubber is used, or the ruber washers are bonded to essentially cut in half the maximum stresses therein. With this rubber washer of outside diameter of .875 inch the ratio of washer outside diameter to motor outside diameter is approximately 15 percent. Thus, keeping within reasonable limtis the thickness and outside diameter of the rubber washer, it would appear that with electric motors of average proportions of diameter to length that the outside diameter of the rubber washer should be about 15 to 40 percent of the outside diameter of the electric motor.

It is presumed in the discussion above that the motor is constructed in such fashion as to make the center of gravity of the stator lie on the axis of the shaft, in other words, that the motor is symmetrical about the shaft. In case the stator structure is unsymmetrical, or has fastened to it an unsymmetrically mounted mass, the axis of the rubber mounting shall preferably be made to pass through the center of gravity, otherwise compressive forces will be set up in the rubber sleeve 26, and the rubber washers will have a higher moment of inertia.

From the above it can be seen that it is most economical in rubber to make $b$ and consequently D as small as possible. There is another reason why D should be small. As D is made smaller by the multiplier $b$, the thickness $t$ is made smaller by the multiplier $b^4$. In other words, the thickness becomes smaller very much faster than the diameter and, as the ratio of thickness to diameter is reduced, the amount of droop is also reduced and the less the droop the better.

The limit to which the outside diameter of the washers may be reduced and the thickness of the washer also reduced to maintain constant K is probably determined by two things. As the size of the washer is reduced, the mechanical stresses in the washer are increased until the maximum permissible average mechanical stresses are reached. A further reduction in diameter would cause too short a life for the mounting. Also, as the diameter is reduced the rubber thickness is very much reduced and a point is reached where it is not practical to make the washers still thinner or slight mechanical irregularities would cause very high local stresses and failure or would cause a bend tending to constrain the motion which the washers are intended to permit and thus defeat the purpose of the mounting. The above shows that so far as effectiveness of the rubber washer mounting is concerned the outside diameter of the washers bears a fairly constant relation to the outside diameter of the motor and should be preferably less than 40 percent of the outside diameter of the motor. The minimum diameter is also fairly constant in relation to the diameter of the motor in so far as average loading of the rubber is concerned and should be preferably greater than 15 percent of the outside diameter of the motor. The limitation as regards the localized stresses caused by irregularities is, of course, dependent on the accuracy to which the parts are made and must be determined after consideration of the accuracies actually obtained.

To show that the maximum permissible diameter of the washer is related to the outside diameter of the motor, consider that, as has been explained above, for a motor stator of a certain moment of inertia I around its axis the spring constant K of the mounting must not exceed a certain value which is proportional to the stator moment of inertia. For a motor having a frame length $L_s$ proportional to its diameter $D_s$, its moment of inertia $I_s$ varies approximately as the fifth power of the outside diameter.

$$I_s = \text{constant} \times D_s^4 \times L$$

and if $L_s = C D_s$, where C is a constant, (34)

$$I_s = \text{constant} \times D_s^5 \quad (35)$$

For a constant thickness of rubber washer the spring constant K varies approximately as the fourth power of the outside diameter of the washer, therefore, $$K = \text{constant} \times D^4 \quad (36)$$

Since the maximum permissible spring constant of the rubber is related to the stator moment of inertia;

$$K_{\text{max.}} = \text{constant} \times I_s \quad (37)$$

then the maximum permissible diameter of the rubber washers bears an approximately constant relationship to the outside diameter of the stator, namely, $$D_{\text{max. washer}} = \text{constant } D_s^{5/4} \quad (38)$$

This means that the maximum permissible outside diameter of the washer is approximately proportional to the outside diameter of the stator.

If the motor length is increased proportionally to its diameter, as the motor is made larger, its weight will vary as the third power of the diameter, and the lever arm of this weight will vary as the first power of the motor diameter making the torque tending to cause droop vary as the fourth power of the diameter.

$$M_{\text{droop}} = \text{constant} \times D_s^4$$

Since the section modulus Z of the rubber washers about a diameter of the washers, which is a measure of the maximum stress in the rubber of the washers, varies as the third power of the outside diameter of the washers:

$$Z = \frac{I}{D/2} = \frac{(\pi/4) D^4}{D} = C_1 D^3 \quad (39)$$

where $C_1$ is a constant, and for constant stress in the washers the section modulus must be proportional to the moment causing droop.

$$\text{Section modulus } Z = \text{constant} \times M_{\text{droop}} \quad (40)$$

and from Equations 39 and 40, $$C_1 D^3 \text{ min. washer} = \text{constant} \times D_s^4 \quad (41)$$

$$D_{\text{min. washer}} = \text{constant} \times D_s^{4/3} \quad (42)$$

The above equation means that the minimum permissible diameter of the rubber washers is closely proportional to the outside diameter of the stator of the motor.

Actually it should be of interest to note that as the motor is made large, this analysis indicates that both the maximum permissible outside diameter of the rubber washers and the minimum permissible diameter of the washers will increase slightly in relation to the outside diameter of the stator.

From Equations 25 and 27, one sees that the droop is very small. This is due not only because the elastic washer is thin relative to its diameter, but because the stiffness of rubber, or its spring constant, is much greater in compression than in shear. Thus, any mechanical unbalance of the motor rotor, which causes vibration perpendicular to the shaft, is satisfactorily resisted by the elastic mounting, since the elastic washers are in compression to this vibration. As stated at the beginning of the specification, the unbalanced mechanical vibration is 13.3 cycles per second perpendicular to the shaft for an eight hundred r.p.m. motor. The present mounting is sufficiently stiff in the axial direction; as evidenced by Equation 25 to establish a translational and perpendicular to the shaft natural frequency of vibration of more than twice this impressed frequency, namely, more than 26.6 cycles per second. With smaller diameter washers becoming thinner more rapidly than the diameter is decreased, for the same rotational spring constant, then the compressional spring constant is even more increased.

My motor mounting for mounting the housing of the motor directly on to the pump housing provides a resilient mounting wherein the resilient material also serves as a seal for the pump housing. Although I describe the use of this resilient mounting in connection with a fluid pump, it is understood that it may be used in any rotative load or circulating device having a drive shaft extending outside the housing of that device and driven by a motor.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A motor and elastic mounting therefor, said motor having an axis, said mounting comprising, a support, a radially thin elastic sleeve member, means on said motor for mounting said elastic sleeve member between one end of said motor and said support to effect the sole support of said motor, and said member having a given outside dimension perpendicular to said axis less than forty percent of the maximum outside dimension of said motor perpendicular to said axis.

2. A machine and cantilever mounting therefor, said machine having a torque vibration around the axis thereof and an impressed frequency of vibration perpendicular to the shaft axis, said mounting comprising, a support, an elastic sleeve member, a coaxial hub at one end of said machine, means mounting said sleeve member between said hub and said support to mount said machine as a cantilever solely through said member, said coaxial mounting of said sleeve member subjecting said member to rotational shear stress due to said torque vibration, said sleeve member being sufficiently small in diameter relative to the diameter of said machine that the natural frequency of rotary vibration of the machine about said axis is no greater than twenty percent of the torque vibration frequency yet the sleeve member is sufficiently thin relative to its diameter that the natural frequency of vibration perpendicular to the shaft axis is at least twice the impressed frequency of vibration perpendicular to the shaft.

3. A motor and elastic mounting therefor, said motor having a given outside diameter and adapted to have, when in operation, an impressed frequency of torque vibration about the shaft axis of the motor, said mounting comprising, a support, a coaxial hub on one end of said motor, an elastic sleeve member, means fastening said member between said hub and said support to resiliently carry and effect substantially the sole support of said motor and with the axes of the motor and member substantially coincident, said fastening means subjecting at least a portion of said member to a rotational shear stress from said impressed frequency torque vibration, the portion of said elastic member resisting said shear force having a dimension in a direction perpendicular to the direction of application of the shear force which is small relative to the dimension of the said shear resisting portion in the direction of said shear force, and the maximum dimension of said elastic member perpendicular to said axis being less than thirty percent of the outside diameter of said motor.

4. An electric motor and an elastic mounting therefor, said mounting comprising, a support having a cylindrical bore, a housing for said motor, a motor rotor within said housing, a face wall on said housing, a hub smaller than said housing with an outer substantially cylindrical surface extending from said face wall coaxial with said rotor, said outer cylindrical surface having a length exceeding the diameter thereof, a shaft journalled relative to said housing and carrying said motor rotor, said shaft extending coaxially within said hub with a rotational working clearance therebetween, said hub extending coaxially within said support bore with a sleeve spacing therebetween, a rotatable shaft seal sealing said shaft and said motor housing hub, and a resilient sleeve filling said sleeve spacing and being under radial compression and rotational shear to constitute the sole support of said motor housing from said support and also sealing against fluid leakage between said hub and said support, said sleeve having an outside diameter less than forty percent of the outside diameter of the motor.

5. An electric motor and an elastic mounting therefor, said mounting comprising, a support having a cylindrical bore, said cylindrical bore having a length exceeding the diameter thereof, a housing for said motor, a motor rotor within said motor housing, a face wall on said motor housing, a motor housing hub smaller than said motor housing with an outer substantially cylindrical surface extending from said face wall coaxial with said motor rotor, said outer cylindrical surface having a length exceeding the diameter thereof, a shaft journalled relative to said motor housing and carrying said motor rotor, said shaft extending coaxially within said motor housing hub on the motor housing with a rotational working clearance therebetween and said motor housing hub extending coaxially within said support bore with a sleeve spacing therebetween, a rotatable shaft seal sealing said shaft and said motor housing hub, and a resilient sleeve having a length greater than the diameter thereof filling said sleeve spacing and being under radial compression and rotational shear to constitute the sole support of said motor housing from said support and also sealing against fluid leakage between said hub and said support, said sleeve having an outside diameter less than forty percent of the outside diameter of said motor.

References Cited in the file of this patent

UNITED STATES PATENTS

| | | |
|---|---|---|
| 1,863,043 | Johnson | June 14, 1932 |
| 2,004,532 | Mapes | June 11, 1935 |
| 2,020,092 | Allen | Nov. 5, 1935 |
| 2,089,066 | Morrill | Aug. 3, 1937 |
| 2,116,099 | Chamberlain | May 3, 1938 |
| 2,177,459 | Price | Oct. 24, 1939 |
| 2,188,807 | Castricone | Jan. 30, 1940 |
| 2,215,666 | Meitzler | Sept. 24, 1940 |
| 2,221,745 | Kirby | Nov. 12, 1940 |
| 2,295,965 | Pierce | Sept. 15, 1942 |
| 2,386,505 | Puchy | Oct. 9, 1945 |